(12) United States Patent
Lu et al.

(10) Patent No.: US 7,762,687 B2
(45) Date of Patent: Jul. 27, 2010

(54) LIGHT SOURCE DEVICE

(75) Inventors: Hou-Chen Lu, Taipei Hsien (TW); Kai Huang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 163 days.

(21) Appl. No.: 12/109,682

(22) Filed: Apr. 25, 2008

(65) Prior Publication Data
US 2009/0097253 A1 Apr. 16, 2009

(30) Foreign Application Priority Data
Oct. 11, 2007 (CN) .......................... 2007 1 0202018

(51) Int. Cl.
*F21V 19/02* (2006.01)
(52) U.S. Cl. ............. 362/285; 362/296.06; 362/296.08; 313/113
(58) Field of Classification Search ................. 362/285, 362/296.06, 296.08; 313/113
See application file for complete search history.

(56) References Cited

U.S. PATENT DOCUMENTS

| | | | |
|---|---|---|---|
| 3,700,881 A * | 10/1972 | Slomski ...................... 362/265 |
| 5,506,464 A * | 4/1996 | Ooms .......................... 313/113 |
| 5,855,488 A | 1/1999 | Heintz et al. |
| 6,059,433 A * | 5/2000 | Otaka et al. .................. 362/507 |
| 6,849,993 B2 * | 2/2005 | Kai et al. ..................... 313/113 |
| 7,619,351 B2 * | 11/2009 | Watanabe et al. ........... 313/267 |
| 2005/0254234 A1 * | 11/2005 | Wang .......................... 362/184 |
| 2006/0007410 A1 * | 1/2006 | Masuoka et al. .............. 353/99 |
| 2007/0159823 A1 * | 7/2007 | Ho et al. ...................... 362/253 |

* cited by examiner

*Primary Examiner*—Sandra L O'Shea
*Assistant Examiner*—Evan Dzierzynski
(74) *Attorney, Agent, or Firm*—Andrew C. Cheng

(57) ABSTRACT

A light source device includes a lampshade, a lamp, a cover, a first electrical wire, a second electrical wire, and a metallic clamping element. The lampshade includes an outer sidewall surface, an inner sidewall surface, and a light exit. An electrical connector is located on the outer sidewall surface of the lampshade. The lamp is contained in the lampshade. The cover covers the light exit. One end of the first electrical wire is electrically connected to the electrical connector and another end is connected to the metallic clamping element. One end of the second electrical wire is electrically connected to the lamp and another end is connected to the metallic clamping element, thereby electrically connecting the first electrical wire to the second electrical wire.

11 Claims, 4 Drawing Sheets

LIGHT SOURCE DEVICE

BACKGROUND

1. Technical Field

The present invention relates generally to light source devices.

2. Description of Related Art

Presently, various types of projectors are widely used. Generally, the projector includes a light source device having a lamp, such as an incandescent lamp or quartz bulb, which enables the projection of images onto a screen.

Referring to FIG. 4, a light source device 100 of a projector in accordance with related art is shown. The light source device 100 includes a metallic lampshade 10, a lamp 20, an electrical wire 30, and a metallic cover 23. The lampshade 10 is half-elliptic shaped in its profile, and forms a light exit 14 at an open side thereof. The lamp 20 includes a lamp head 21 and a lamp tube 22. The lamp 20 is contained in the lampshade 10. An electrical connector 12 for receiving power is located in an outer surface 11 of the lampshade 10. One end of the electrical wire 30 is electrically connected to the lamp head 21, and another end is electrically connected to the electrical connector 12. The lamp 20 emits light via the lamp tube 22 when powered up. The cover 23 covers the light exit 14 of the lampshade 10.

If the lamp 20 is left on for a long period of time or the projector overheats, the lamp tube 22 of the lamp 20 may explode, causing the electrical wire 30 to come in contact with the cover 23 and the lampshade 10, creating a short circuit. Thus, internal components of the projector, which may be in direct or indirect contact with the cover 23 and the lampshade 10 of the projector, may be damaged or destroyed.

SUMMARY

The present invention relates to a light source device. The light source device includes a lampshade, a lamp, a cover, a first electrical wire, a second electrical wire, and a metallic clamping element. The lampshade includes an outer sidewall surface, an inner sidewall surface, and a light exit. An electrical connector is located on the outer sidewall surface of the lampshade. The lamp is contained in the lampshade. The cover covers the light exit. One end of the first electrical wire is electrically connected to the electrical connector and another end is connected to the clamping element. One end of the second electrical wire is electrically connected to the lamp and another end is connected to the metallic clamping element, thereby electrically connecting the first electrical wire to the second electrical wire.

Other advantages and novel features of the present invention will become more apparent from the following detailed description of preferred embodiment when taken in conjunction with the accompanying drawings.

BRIEF DESCRIPTION OF THE DRAWINGS

Many aspects of the present light source device can be better understood with reference to the following drawings. The components in the drawings are not necessarily drawn to scale, the emphasis instead being placed upon clearly illustrating the principles of the present light source device. Moreover, in the drawings, like reference numerals designate corresponding parts throughout the several views.

DETAILED DESCRIPTION OF THE EMBODIMENTS

Reference will now be made to the drawings to describe the various embodiments in detail.

Figure 1:
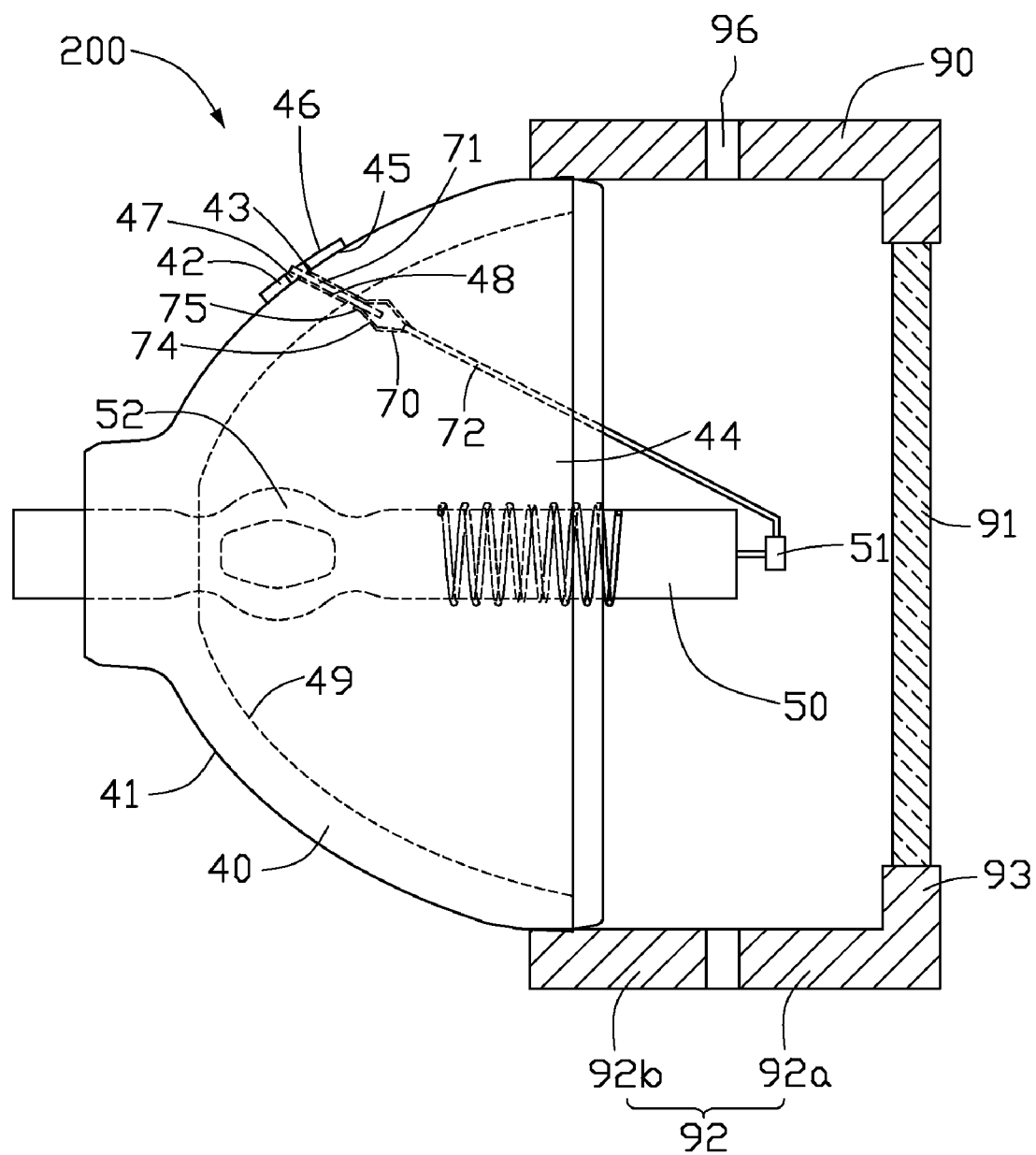
FIG. 1 a schematic view of a light source device of a projector in accordance with a first embodiment of the present invention.

Referring to FIG. 1, a light source device 200 according to a first embodiment of the present invention is shown. The light source device 200 includes a lamp 50, a lampshade 40, a first electrical wire 71, a second electrical wire 72, a metallic clamping element 70, and a cover 90. The light source device 200 can be used as a projection lamp of a projector.

The lampshade 40 may be half-elliptic shaped in profile. The lampshade 40 includes an outer sidewall surface 41 and an inner sidewall surface 49. A light exit 44 is enclosed by the inner sidewall surface 49 and the outer sidewall surface 41 of the lampshade 40. An electrical connector 42 is located on the outer sidewall surface 41 of the lampshade 40. The electrical connector 42 is used for receiving power for the lamp 50 of the light source device 200. The electrical connector 42 may have an annular configuration. A recess 47 is defined in a center of the electrical connector 42. The electrical connector 42 may include an insulating surface 45 and an opposite electrically conducting surface 46. The insulating surface 45 of the electrical connector 42 may be in contact with the outer sidewall surface 41 of the lampshade 40. A through hole 43 is defined in the lampshade 40 and corresponds with the recess 47 of the electrical connector 42, so that an inside of the lampshade 40 directly connects with an outside environment. An insulating layer (not shown) may be spread on an inner surface of the through hole 43 of the lampshade 40.

The lamp 50 includes a lamp head 51 and a lamp tube 52. The lamp 50 is contained in an inner space of the lampshade 40. The lamp tube 52 has a fixing end, which is fixed to the inner sidewall surface 49 of the lampshade 40, and an opposite free end protruding into a central portion of the light exit 44 of the lampshade 40. The lamp head 51 is disposed on the opposite free end of the lamp tube 52. Preferably, the opposite free end of the lamp tube 52 protrudes toward a focal point of the lampshade 40, thus positioning the lamp head 51 at the focal point.

One end of the first electrical wire 71 extends through the through hole 43 of the lampshade 40 and the recess 47 of the electrical connector 42, and is electrically connected to the conducting surface 46.

One end of the second electrical wire 72 is electrically connected to the lamp head 51 of the lamp 50.

Another end of the first electrical wire 71 and another end of the second electrical wire 72 are electrically connected to each other through the metallic clamping element 70. The metallic clamping element 70 may be integrally formed with the second electrical wire 72 and may include two elbow-shaped elastic clamping arms 74. Each of the elastic clamping arms 74 includes a clamping portion 75. The clamping portions 75 of the metallic clamping element 70 provide a clamping force for clamping the second end of the first electrical wire 71. Therefore, the first electrical wire 71 and the second electrical wire 72 are electrically connected to each other via the metallic clamping element 70. The clamping portions 75 of the elastic clamping arms 74 are configured to be in contact with the inner sidewall surface 49 of the lampshade 40.

Alternatively, the metallic clamping element 70 can be integrally formed with the first electrical wire 71.

The cover 90 includes a hollow columnar portion 92 and a sealing portion 93. The sealing portion 93 of the cover 90 extends perpendicularly and inwardly from one end 92a of the hollow columnar portion 92. The outside wall surface 41 of the lampshade 40 is attached to another end 92b of the columnar portion 92, so that an inner space defined in the columnar portion 92 is connected to the light exit 44 of the lampshade 40. A plurality of first threads is formed on an inner surface of the other end 92b of the columnar portion 92. A plurality of second threads is formed on the outer sidewall surface 41 of the lampshade 40. The first threads are screwed into the second threads to connect the cover 90 to the lampshade 40. A light guide element 91 is located on a central area of the sealing portion 93 of the cover 90, hermetically sealing an inner space of the light source device 200. Light emitted by the lamp 50 is guided out of the light source device 200 through the light guide element 91 of the cover 90. In this embodiment, the light guide element 91 is a UV filter embedded in the center of the sealing portion 93 of the cover 90. Two heat dissipation holes 96 are defined in the hollow columnar portion 92 of the cover 90 and are arranged symmetrically relative to the lamp tube 52 of the lamp 50. The two heat dissipation holes 96 each may be set to connect with the interior of the lampshade 40 so that the heat dissipation holes 96 connect the inner side of the lampshade 40 with the outside environment and function as air outlets of the light source device 200, whereby air inside the lampshade 40 can be conveniently discharged from the lampshade 40 via the heat dissipation holes 96.

Figure 2:
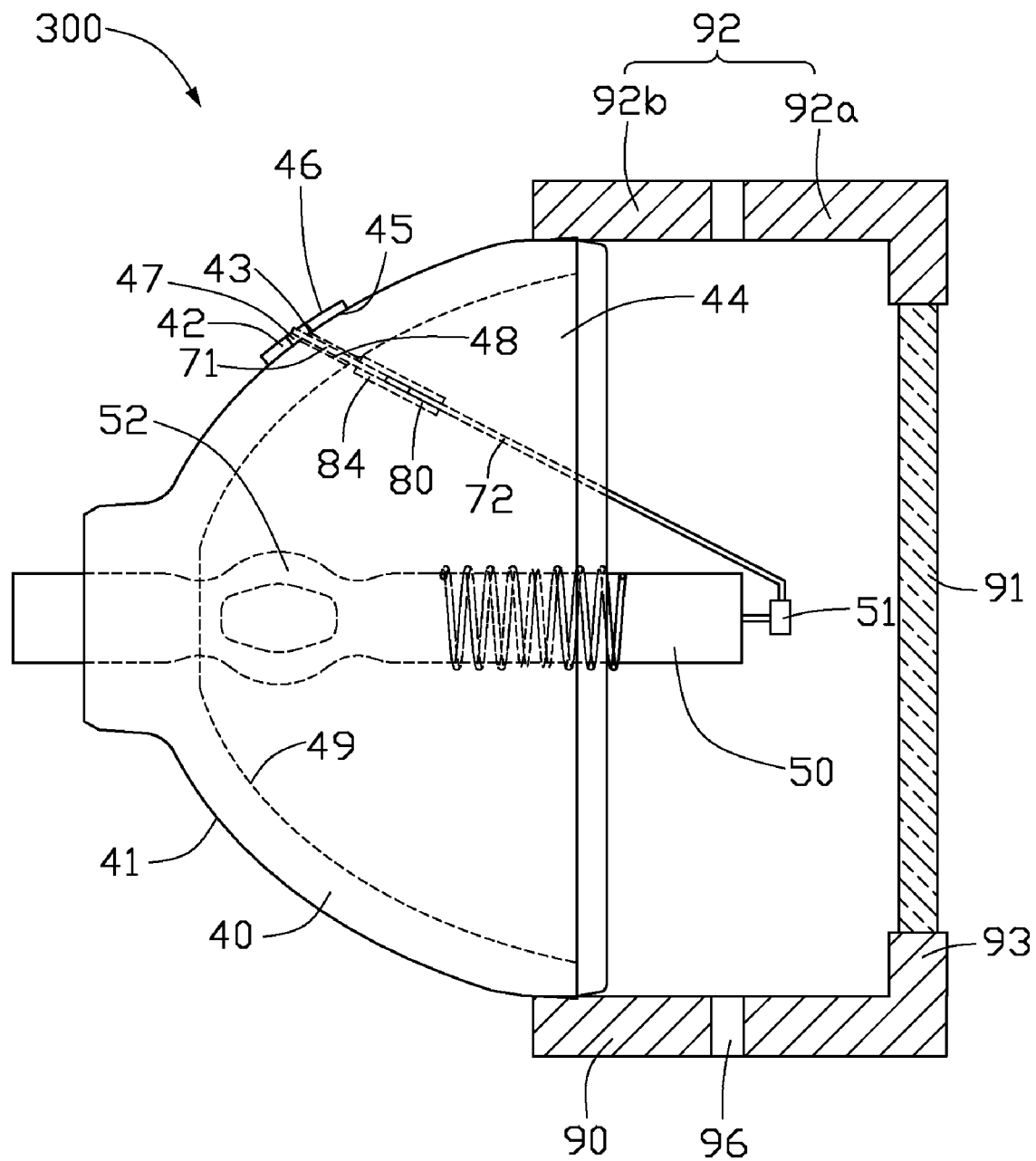
FIG. 2 is a schematic view of a light source device of a projector in accordance with a second embodiment of the present invention.
Figure 3:
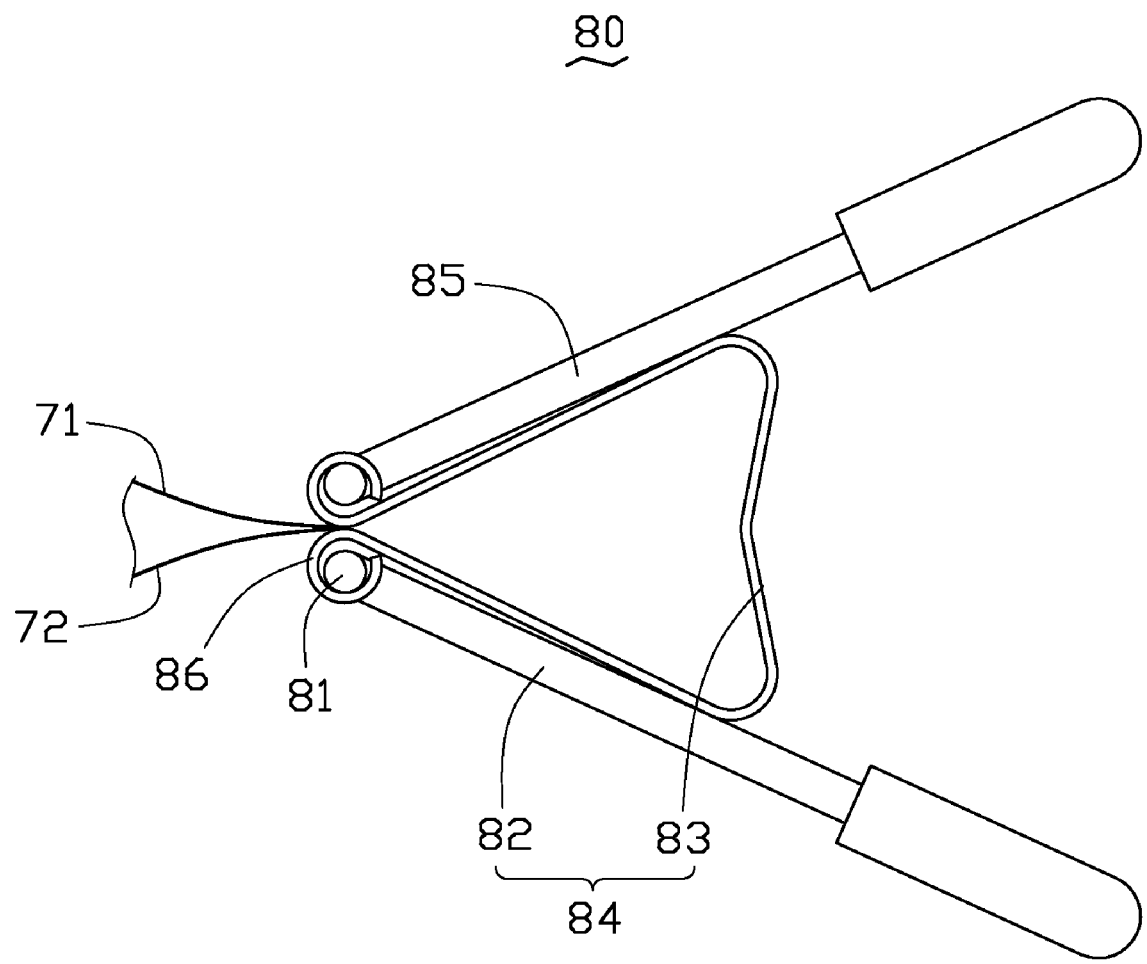
FIG. 3 is an enlarged, side elevational view of a metallic clamping element of the light source device of FIG. 2.
Figure 4:
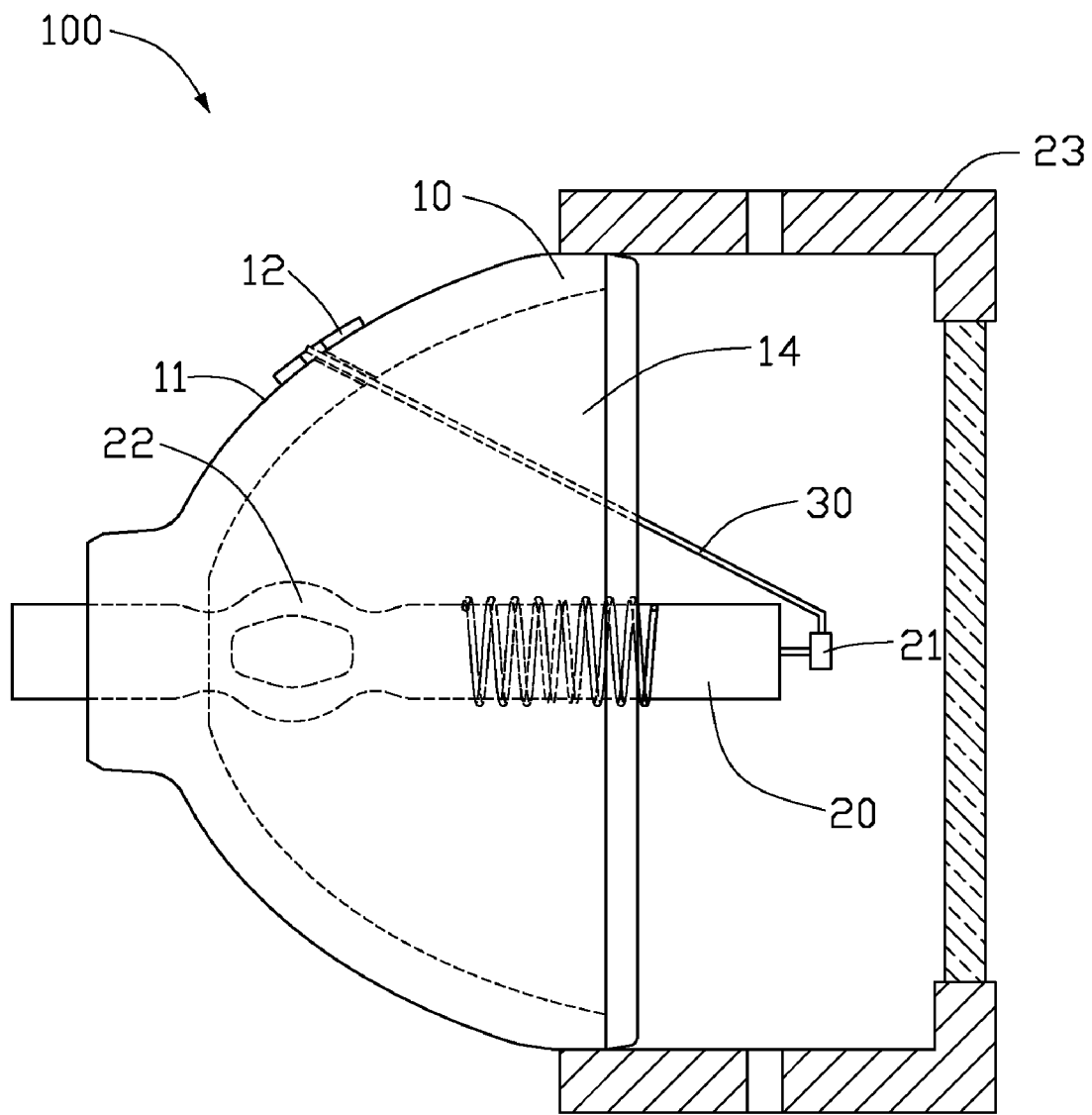
FIG. 4 is a schematic view of a light source device of a projector according to a related art.

Referring to FIG. 2, a light source device 300 according to a second embodiment of the present invention is shown. Except for the shape of the metallic clamping element, other parts of the light source device 300 are substantially the same as the light source device 200 of the first embodiment. The metallic clamping element, the first electrical wire 71, and the second electrical wire 72 are formed separately. More specifically, the metallic clamping element is a metallic double-clip 80. Referring to FIG. 3, the double-clip 80 includes a main body 84 comprising a pair of opposed clipping walls 82 for holding the other ends of the first and second electrical wires 71, 72, and a back wall 83 continuously and integrally bridging the opposed clipping walls 82. The clamp main body 84 has a generally isosceles-triangular-shaped cross-section. The back wall 83 forms a base of the triangle, and the clipping walls 82, which extend from two opposed sides of the back wall 83 respectively, are normally closed to form an apex of the triangle. Free ends of the clipping walls 82 are tightly curled to form two receiving cylinders 86. Two operating levers 85 for opening and closing the double-clip 80, each having an attaching shaft 81 formed thereon, are attached to the double-clip 80 by inserting the attaching shafts 81 into the receiving cylinders 86, so that each operating lever 85 abuts a corresponding clipping wall 82. The other ends of the first and second electrical wires 71, 72 are clamped between the two clipping walls 82 of the double-clip 80. Thus, the first electrical wire 71 and the second electrical wire 72 are electrically connected with each other via the metallic double-clip 80.

Should the lamp tube 52 of the lamp 50 explode, the other ends of the first and second electrical wires 71, 72 disengage from the clamping element 70 or the double-clip 80. Therefore, the second electrical wire 72 and the first electrical wire 71 are disconnected from each other, and the electrical connection between the first and the second electrical wires 71, 72 is cut, so that no short circuit is made with the cover 90 and the lampshade 40.

It will be understood that the above particular embodiments and methods are shown and described by way of illustration only. The principles and features of the present invention may be employed in various and numerous embodiments thereof without departing from the scope of the invention as claimed. The above-described embodiments illustrate the scope of the invention but do not restrict the scope of the invention.

What is claimed is:

1. A light source device comprising:
a lampshade comprising an outer sidewall surface, an inner sidewall surface and a light exit defined in the lampshade, wherein an electrical connector is located on the outer sidewall surface of the lampshade;
a lamp contained in the lampshade;
a cover covering the light exit;
a first electrical wire having one end electrically connected to the electrical connector;
a second electrical wire having one end electrically connected to the lamp; and
a metallic clamping element connected to another end of the first electrical wire and another end of the second electrical wire for electrically connecting the first electrical wire to the second electrical wire;
wherein the metallic clamping element is integrally formed with the second electrical wire, and the metallic clamping element comprises two elastic clamping arms extending from the other end of the second electrical wire.

2. The light source device of claim 1, wherein the lamp comprises a lamp head and a lamp tube, and the one end of the second electrical wire is electrically connected to the lamp head of the lamp.

3. The light source device of claim 1, wherein each of the two elastic clamping arms is elbow-shaped.

4. The light source device of claim 1, wherein the lampshade is half-elliptic shaped in profile, and the lamp head of the lamp is positioned at a focal point of the lampshade.

5. The light source device of claim 1, wherein a through hole is defined in the lampshade for connecting an inside of the lampshade with an outside environment, and the one end of the first electrical wire travels through the through hole to connect electrically to the electrical connector.

6. The light source device of claim 1, wherein the cover comprises a hollow columnar portion and a sealing portion extending inwardly from one end of the hollow columnar portion.

7. The light source device of claim 1, wherein a plurality of first threads is formed on one end of the cover, a plurality of second threads is formed on the outer sidewall of the lampshade, and the plurality of first threads are screwed into the plurality of second threads to connect the cover to the lampshade.

8. The light source device of claim 1, wherein at least part of the cover is conductive.

9. A light source device comprising:
a lampshade comprising an outer sidewall surface, an inner sidewall surface and a light exit defined in the lampshade, wherein an electrical connector is located on the outer sidewall surface of the lampshade;
a lamp contained in the lampshade;
a cover covering the light exit;
a first electrical wire having one end electrically connected to the electrical connector;

a second electrical wire having one end electrically connected to the lamp; and a metallic clamping element connected to another end of the first electrical wire and another end of the second electrical wire for electrically connecting the first electrical wire to the second electrical wire;

wherein the metallic clamping element is integrally formed with the first electrical wire, and the metallic clamping element comprises two elastic clamping arms extending from the other end of the first electrical wire.

10. The light source device of claim 9, wherein each of the two elastic clamping arms is elbow-shaped.

11. A light source device, comprising:

a lampshade comprising an outer sidewall surface, an inner sidewall surface and a light exit defined in the lampshade, wherein an electrical connector is located on the outer sidewall surface of the lampshade;

a lamp contained in the lampshade;

a cover covering the light exit;

a first electrical wire having one end electrically connected to the electrical connector;

a second electrical wire having one end electrically connected to the lamp; and a metallic clamping element connected to another end of the first electrical wire and another end of the second electrical wire for electrically connecting the first electrical wire to the second electrical wire;

wherein the metallic clamping element comprises double-clip having a pair of opposed clipping walls for clamping the other end of the first electrical wire and the other end of the second electrical wire, and a back wall continuously and integrally bridging said clipping walls.

* * * * *